US011431026B1

(12) United States Patent
Chinnam et al.

(10) Patent No.: US 11,431,026 B1
(45) Date of Patent: Aug. 30, 2022

(54) POLYMER-BASED HYBRID SOLID ELECTROLYTE THAT EXHIBITS HIGH ROOM TEMPERATURE IONIC CONDUCTIVITY

(71) Applicant: NEI Corporation, Somerset, NJ (US)

(72) Inventors: Parameswara Rao Chinnam, Monroe, NJ (US); Runqing Ou, Bridgewater, NJ (US)

(73) Assignee: NEI Corporation, Somerset, NJ (US)

( * ) Notice: Subject to any disclaimer, the term of this patent is extended or adjusted under 35 U.S.C. 154(b) by 582 days.

(21) Appl. No.: 16/397,068

(22) Filed: Apr. 29, 2019

(51) Int. Cl.
*H01M 10/0565* (2010.01)
*H01M 10/0525* (2010.01)

(52) U.S. Cl.
CPC ... *H01M 10/0565* (2013.01); *H01M 10/0525* (2013.01); *H01M 2300/0082* (2013.01)

(58) Field of Classification Search
CPC ......... H01M 10/0565; H01M 10/0525; H01M 2300/0082

USPC ........................................................ 429/317
See application file for complete search history.

(56) References Cited

U.S. PATENT DOCUMENTS

| 2014/0120249 | A1* | 5/2014 | Kimura | G11B 5/84 427/130 |
| 2017/0294678 | A1* | 10/2017 | Lee | H01M 10/058 |
| 2019/0036147 | A1* | 1/2019 | Yuan | H01M 12/08 |

* cited by examiner

*Primary Examiner* — Gary D Harris
(74) *Attorney, Agent, or Firm* — William L. Botjer (57) ABSTRACT

A polymer hybrid solid electrolyte that possesses high room temperature ionic conductivity, very low interfacial resistance with the electrodes and electrochemical stability window up to 5.2 volts. The polymer-ceramic hybrid solid electrolyte includes: a PEO based copolymer electrolyte; a solvate ionic liquid (SIL); and a salt of a monovalent cation. The inclusion of an ionically conductive additive, such as a ceramic fine powder, can further improve ionic conductivity as well as mechanical properties.

17 Claims, 8 Drawing Sheets

POLYMER-BASED HYBRID SOLID ELECTROLYTE THAT EXHIBITS HIGH ROOM TEMPERATURE IONIC CONDUCTIVITY

BACKGROUND OF THE INVENTION

Lithium-ion batteries have provided a lightweight energy-storage solution that has enabled many of today's high-tech devices—from smartphones to electric cars. Although these batteries are generally safe, fire and explosion concerns have caused the industry to move towards replacing liquid components used in existing lithium-ion batteries with all solid materials. This would not only solve the safety issue, but would also provide several other significant advantages, such as greater energy storage ability (pound for pound at the battery pack level), elimination of dendrite formation (tiny, fingerlike metallic projections called dendrites that can grow through the electrolyte layer and lead to short-circuits), chemical and electrochemical stability over a wide voltage window (0-6V), and exceptionally long cycle life (>50,000 cycles).

State-of-the-art solid electrolyte materials have generally failed to meet the requirements of a solid-state lithium battery. The two areas where solid electrolyte materials fall short of their liquid counterpart are the lack of room temperature ionic conductivity and the huge interfacial resistance posed by the electrode-electrolyte interface. Of the two broad categories of solid electrolytes (inorganic electrolyte and polymer electrolyte), inorganic electrolytes have larger ionic conductivity (lithium ion conductors in the form of oxides (LISICON) and sulfide-based (thio-LISICON) compositions have shown relatively high room temperature conductivity of $\sim 10^{-4}$-$10^{-7}$ and $10^{-2}$-$10^{-4}$ S/cm, respectively), but have issues of large electrode electrolyte interface, due to the rigidity of inorganic materials. The problem is exacerbated during repeated cycling.

In contrast, polymer electrolytes are much more flexible than inorganic electrolytes and have less interfacial resistance with the electrodes. However, polymer electrolyte suffers from poor ionic conductivity. The most common polymer electrolyte is a high molecular weight ($M_n > 10^5$) linear poly (ethylene oxide) (PEO) containing a lithium salt such as LiTFSI (lithium bis(trifluoromethanesulfonyl)imide) Such polymers exhibit appreciable ionic conductivity ($\sigma > 10^{-4}$ S/cm) at elevated temperatures (typically 80-100° C.); at lower temperatures the conductivity is poor due to the presence of crystallites in the PEO which restrict ion mobility. One popular approach to address the low ionic conductivity is to use liquid plasticizers, which results in the most improvement in Lithium ion conductivity, generally exceeding $1 \times 10^{-3}$ S/cm. However, the solvent deteriorates the electrolyte's (which also acts as a separator between the cathode and anode) mechanical properties and increases its reactivity towards the lithium metal anode. Additionally, it is likely that the gel may dry out, creating resistive domains in the electrolyte which may lead to hot spots and compromise cell safety. This means the loss of the most important intrinsic feature of a solid polymer electrolyte.

Many efforts have been made to improve the electrochemical properties polymer electrolytes in addition to ionic conductivity such as high anodic (at cathode) and cathodic (at anode) stability, large stability window, low interfacial resistance and strong adhesion with electrodes, and high thermal stability. Obtaining a solid electrolyte that has high ionic conductivity, and at the same time exhibits low interfacial resistance with the electrodes has remained a challenge. A further desirable feature of the solid electrolyte is that it is compatible with high voltage electrode materials so that high energy density can be achieved.

Recently, it was reported that equimolar mixtures of triglyme (triethylene glycol dimethyl ether (G3)) or tetraglyme (tetraethylene glycol dimethyl ether (G4)) and lithium bis(trifluoromethanesulfonyl)-imide (LiTFSI) exhibit similar properties to conventional RTILs (room temperature ionic liquids), such as negligible vapor pressure, thermal stability, and low flammability [Y. Kitazawa, K. Iwata, S. Imaizumi, H. Ahn, S. Y. Kim, K. Ueno, M. J. Park, and M. Watanabe, Macromolecules, 2014, 47, 6009-6016.] In these solvate ionic liquids (SILs), the ligand molecule strongly coordinates with the cations and/or anions of the salts, affording high anodic stability, even though they are composed of ethers. SILs are an interesting group of materials that could be useful for solid electrolyte development. However, SILs are similar to ionic liquids and cannot be used by themselves as solid electrolyte. When SILs are added into a polymer electrolyte such as PEO, it was found that the strong association between the ether ligand and cation was broken, and G3 or G4 became free, which presented a problem in that the resultant material did not have high ionic conductivity and was not stable at high voltages (in excess of 4V). It was also found that when SILs were incorporated into a nonconductive matrix such as PMMA, the disassociation between the ether ligand and the cation did not happen. However, the conductivity of the composite was not good [M. Watanabe, K. Dokko, K. Ueno, and M. L. Thomas, Bulletin of the Chemical Society of Japan, 2018, Vol.91, No.11, 1660-1682.]. Thus, it remained a technical challenge to incorporate SILs into an ionic conducting polymer matrix such as PEO and yet preserving the solvate structure of the SILs inside the polymer phases.

We found that when a PEO based copolymer that has POSS units in the polymer structure was used as a base polymer to incorporate a certain proportion of SILs into the matrix, the unique solvate structure of the SILs was preserved and high ionic conductivity and high voltage stability were achieved. Specifically, we found that a composite electrolyte comprising of 30 to 35 weight percent of SILs and 65 to 60 weight percent of PEO based copolymer electrolyte, simultaneously possessed a high ionic conductivity ($3 \sim 4 \times 10^{-4}$ S/cm) and a high voltage window (5.2V). When SIL content is below 30 wt % and above 35% in the PEO based copolymer, the electrochemical properties are not good. Specifically, below 30 wt %, the conductivity values drop to the order of $10^{-5}$ S/cm and above 35 wt %, the voltage window drops to 4.1V. The key to the good electrochemical performance of 30 wt % to 35 wt % SIL inside the PEO copolymer matrix composition is the POSS units in the PEO copolymer. POSS is known to interact with SIL [S. Chereddy, P. R. Chinnam, V. Chatare, S. P. diLuzio, M. P. Gobet, S. G. Greenbaum, and S. L. Wunder, Mater. Horiz., 2018, 5, 461-473.]. It is this interaction that helps fixing the SIL pockets to the POSS units within the polymer matrix and preventing tetraglyme (G4) from being released as free ether ligand. When 30 wt % to 35 wt % SIL is present, there are enough solvation pockets formed by SILs to arrange into continuous Li$^+$ channels. Below 30 wt % of SIL, the solvation pockets are isolated and not enough to percolate into a conductive network. Above 35 wt %, however, there are not enough POSS units to fix all the SIL pockets and therefore the SIL pockets are subjected to other interactions within the polymer matrix. The tetraglyme (G4) in the SIL can interact with PEG units in the PEO based copolymer and eventually the SIL is not in the coordinated state with Li+ ions and POSS. This is manifested in the deteriorating voltage stability window (<4.1V).

The required optimum weight percentage of SILs made with other glymes, and other lithium or sodium salts, relative to the weight percent of PEO based copolymer would be different in order to achieve good electrochemical properties because of the difference in the solvation shell size and coordinating ability with inorganic POSS. For example, in the case of SIL made with triglyme (G3) and LiTFSI, the weight percentage required for similar electrochemical properties would be lower than one made with tetraglyme and LiTFSI because G3 coordinates strongly with POSS and $Li^+$ ions.

The addition of ionically conducting ceramic particles can enhance the mechanical and electrochemical properties. The particle size of the ceramic is less than 1 micron, and this can lead to a homogeneous dispersion within the ceramic hybrid polymer electrolyte.

The lithium salt can be substituted by sodium salt like NaClO4, NaTFSI in the PEO based copolymer as well as in the SILs to make sodium conducting hybrid composite polymer electrolyte. The weight percentage of the sodium salt in the PEO based copolymer and SIL required to achieve good electrochemical properties will be different.

In the present invention, we have combined different materials (PEO based copolymer and SILs) into a single hybrid solid electrolyte and tuned the weight percentage of SILs to achieve satisfying physical and electrochemical properties based on the structure property relationships.

SUMMARY OF THE INVENTION

The present invention is directed to a novel polymer hybrid solid electrolyte that possesses high room temperature ionic conductivity ($10^{-4}$ S/cm), very low interfacial resistance with the electrodes and electrochemical stability window up to 5.2 volts. The polymer-ceramic hybrid solid electrolyte includes:
 (a) a PEO based copolymer electrolyte;
 (b) a solvate ionic liquid (SIL); and
 (c) a salt of a monovalent cation (which can be a lithium or sodium salt)

There are several structural advantages of the hybrid solid electrolyte. First of all, a PEO based copolymer electrolyte is chosen as the polymer component which has POSS units in the polymer structure to accommodate a certain proportion of SILs into the matrix, where the unique solvate structure of the SILs is preserved and high ionic conductivity and high voltage stability are achieved simultaneously. This solvate ionic liquid acts as a plasticizer and greatly improves the ionic conductivity of the hybrid solid electrolyte. The plasticizer effect also reduces the interfacial resistance between electrolyte and electrodes. However, because the ligand molecule is attached to the anion of the salt, it is "immobilized" and does not react with lithium metal. The PEO based copolymer and solvate ionic liquid work synergistically to provide a conductive robust solid electrolyte. The inclusion of an ionically conductive additive such as a ceramic a fine particle size can further improve ionic conductivity as well as mechanical properties.

BRIEF DESCRIPTION OF THE DRAWINGS

FIGS. 3A and 3B: Structures of Tetraglyme (G4) in FIG. 3A; Lithium bis(trifluoromethanesulfonyl)imide (LiTFSI) in FIG. 3B FIG. 4A and 4B: Structure of Free G4 in FIG. 4A; Solvate Ionic Liquid (SIL) formed by equimolar mixture of Tetraglyme (G4) and LiTFSI in FIG. 4B FIG. 5. Anodic Stability Window of polymer composite electrolyte up to 5.2V—enables high voltage batteries, thereby enhancing energy density FIG. 6. Capacity retention of an ASSLB made hybrid ceramic polymer electrolyte with Lithium metal anode and LFP cathode for continuous usage of 600 hours

PREFERRED EMBODIMENTS OF THE INVENTION

Room temperature ionic liquids (RTILs) have many advantages over the carbonate-based electrolytes in lithium-ion batteries like high thermal stability, low flammability, and high voltage window. However, the high viscosity and low $Li^+$ transference number (<0.1-0.2) of these RTILs inhibit them to be used in the current battery technology. A special type of ionic liquids called solvate ionic liquids (SILs) are composed of equimolar mixtures of triglyme (G3) or tetraglyme (G4) and a lithium salt such as lithium bis(trifluoromethanesulfonyl)-imide (LiTFSI). These have high transference numbers (0.5) and lithium metal anode stability, in addition to the advantages of RTILs. The high transference number, ionic conductivity, anodic and lithium metal anode stability of the SILs are due to the strong coordination of ether ligand molecule with the cations and/or anions of the salts. Although there have been many efforts to incorporate these SILs into a solid polymer matrix to improve the electrochemical properties of polymer electrolytes, these attempts have not been very successful. For example, when SILs are incorporated into a PEO based electrolyte, there is a strong association between ether ligand of the SIL and PEO matrix, which leads to disruption of SIL structure in the polymer matrix making the G3 or G4 free. The free G3 or G4 in the polymer matrix leads to low thermal stability, low ionic conductivity and deteriorated anodic stability (<4V). When SILs are immobilized into a polymer matrix which doesn't have an affinity with ether units such as PMMA, the disassociation between the ether ligand and the cation does not happen. However, the ionic conductivity of the composite is not satisfactory because of the low ionic conductivity of the polymer matrix [M. Watanabe, K. Dokko, K. Ueno, and M. L. Thomas, Bulletin of the Chemical Society of Japan, 2018, Vol.91, No.11, 1660-1682.]. Thus, it remained a technical challenge to preserve the solvate structure of the SILs into an ionic conducting polymer matrix such as PEO.

The present invention is directed to the composition of a hybrid solid electrolyte which comprises a PEO based copolymer, a solvate ionic liquid, and a lithium salt. The PEO based copolymer has POSS units in the polymer chain which acts as anchoring points for the SIL complex. When the POSS containing PEO based copolymer is mixed with SILs in a certain range, the unique solvate structure of the SILs is preserved and high ionic conductivity and high voltage stability are achieved. The PEO based copolymer, the solvate ionic liquid and the lithium salt, in their appropriate concentrations, work together to achieve a high ionic conductivity, high anodic stability and good adhesion to the electrodes. Specifically, a composite hybrid solid electrolyte comprising of 30 to 35 weight percent of SILs and 65 to 60 weight percent of PEO based copolymer electrolyte, simultaneously possesses a high ionic conductivity ($3\sim4\times10^{-4}$ S/cm) and a high voltage window (5.2V).

The above mentioned hybrid solid electrolyte can be combined with ionically conducting additives such as ceramic materials to further improve the electrochemical and mechanical properties of the hybrid solid electrolyte.

EXAMPLES

The present invention is now explained more specifically with reference to some examples.

Example 1

Figure 1:
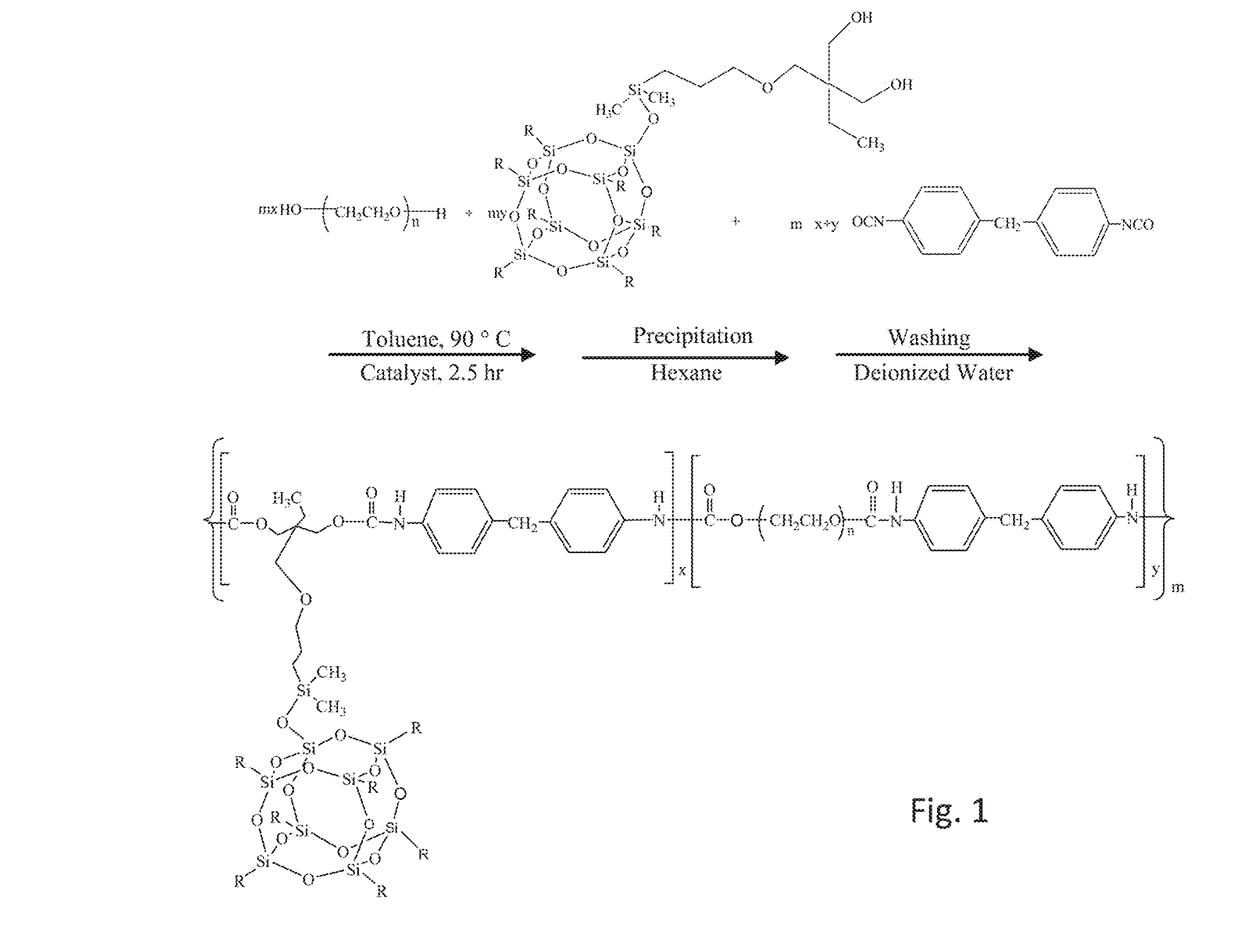
FIG. 1: Synthetic scheme for the preparation of the hybrid thermoplastic polyurethanes (PEO based copolymer) through condensation reaction between 4,4'-methylenebis (phenyl-isocyanate) (MDI) and both of PEG and isobutyl-functionalized POSS-diol (POSS)

A synthetic scheme for the preparation of the hybrid thermoplastic polyurethane through condensation reaction between 4,4'-methylenebis(phenyl-isocyanate) (MDI) and both of PEG and isobutyl-functionalized POSS-diol (PEO based copolymer) is shown in FIG. 1. Briefly, In a 1,000 mL three neck flask, 70 g of PEG (polyethylene glycol, $M_n$=1,000) and 19.53 g of 1,2-PropaneDiolisobutyl POSS were added together with 667 g of toluene. The three neck flask was placed inside a silicone oil bath with the middle neck connected to a condenser tube and another neck connected to nitrogen gas. After all the solid was dissolved, 14.52 g of hexamethylene diisocyanate was added. Then 40 drops of dibutyltin dilaurate were added to the reaction mixture. The oil bath temperature was raised to 90° C. and the reaction was allowed to continue for 12 hours. The reaction product solution was poured into an excess of hexanes to precipitate the polymer. The polymer was washed with more hexanes and dried in vacuum oven at 70° C. The content of hybrid thermoplastic polyurethanes in the polymer hybrid solid electrolyte composition is 30-80%, and preferably 54-58%.

Figure 2:
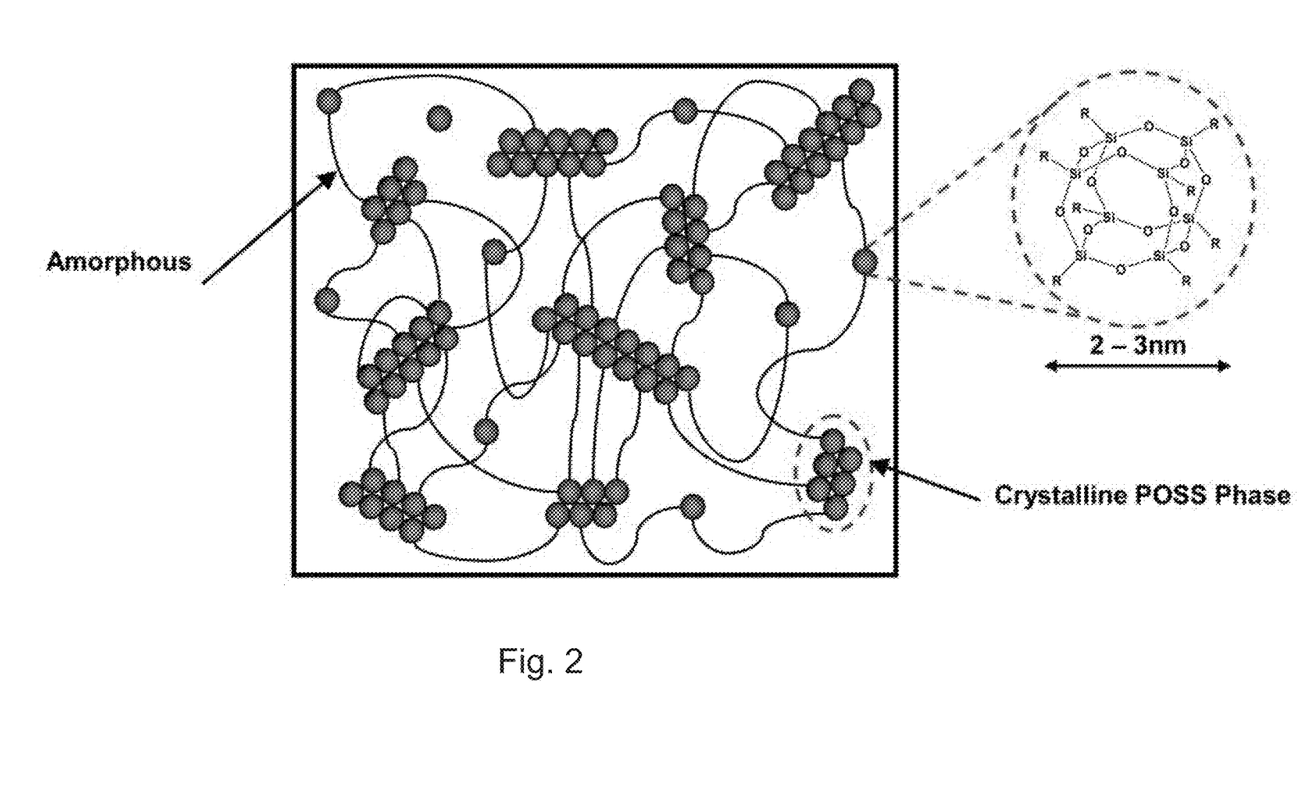
FIG. 2: Schematic representation of the structure of a micro-phase separation-derived hybrid, prepared from PEG-segmented polyurethane incorporating POSS moieties. The solid circle and line represent POSS moiety and PEG network, respectively.

Morphology of the PEO based copolymer: The PEO based copolymer is a multi-block PEO-POSS hybrid thermoplastic polyurethane (PEO-POSS-TPU) consisting of soft PEG segments and hard POSS macromer segments. POSS refers to Polyhedral Oligomeric Silsesquioxane molecules that are 2-3 nm in size. FIG. 2 shows the idealized structure of the multi-block PEO-POSS polyurethane copolymer. In this figure, the spheres represent the POSS cage structures, and the lines represent PEO chains. POSS can crystallize into nanoscale crystals that serve as physical crosslinks of the PEO network. This structure is ideal for polymer electrolyte membranes for several reasons. First, compared with homopolymer PEO, the introduction of bulky inorganic segments into the polymer backbone will disrupt the ability of PEO chains to crystallize and thus will enhance the low temperature lithium ion conductivity, because ion conduction occurs in the amorphous phase of the semi-crystalline PEO. Secondly, microscopic phase separation occurs in this system due to the thermodynamic incompatibility between PEO and POSS, where the POSS molecules form nanocrystals that serve as physical crosslinks in the hydrophilic PEO network, strengthening the polymer network and allowing self-standing films to be obtained. Thirdly, no macroscopic phase separation is expected since the organic and inorganic segments are linked together into a polymer chain. This overcomes the problems associated with using inorganic additives to disrupt crystallization of PEO, where the interfacial energy between the organic and inorganic causes aggregation of inorganic particles.

Example 2

Preparation of Solvate Ionic Liquid Based on Tetraglyme (G4), and lithium bis(trifluoromethanesulfonyl)imide (LiTFSI)

Figure 3A:
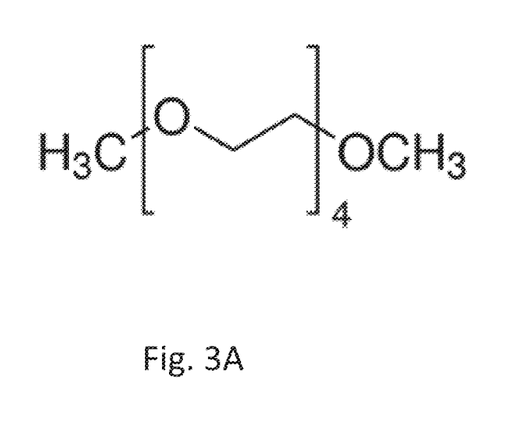
Figure 3B:
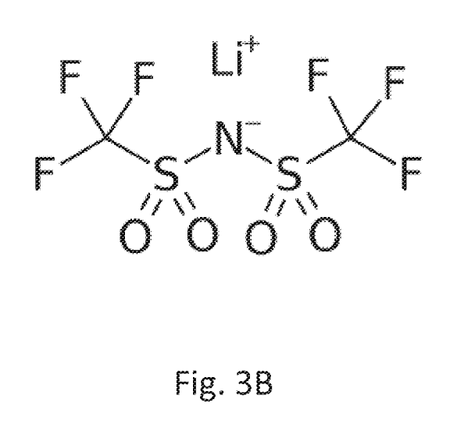
Figure 4A:
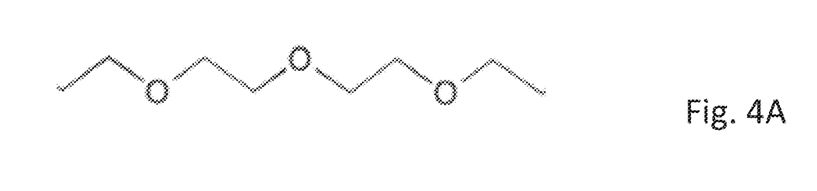
Figure 4B:
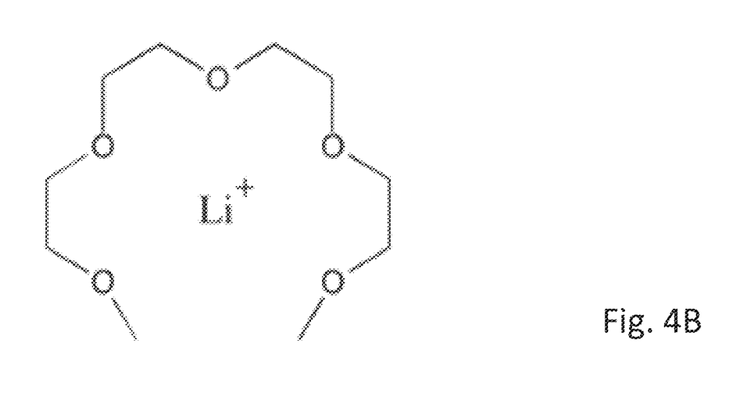

The equimolar mixture of tetraglyme (G4) (6.20 g) and lithium bis(trifluoromethanesulfonyl)imide (Li[TFSI]) (8.0 g) was obtained by adding the two together and stirring for 48 hours at 25° C. The resultant solution was dried at 60° C. for 24 hours in vacuum. The resultant electrolyte solution is called solvate ionic liquid (SIL) since the salt and G4 molecule(s) strongly coordinate with the cations and/or anions of the salts and the resultant properties are similar to those of conventional room temperature ionic liquids (RTILs). The structures of lithium bis(trifluoromethanesulfonyl)imide and solvate ionic liquid (SIL) are shown in FIGS. 3 and 4.

Example 3

Synthesis of Polymer Hybrid Solid Electrolyte

The ionically conducting polymer (0.5 to 0.9 grams) described in Example 1 and 0.1 to 0.14 g of lithium salt (LiTFSI) were dissolved in 3 ml of Acetonitrile (ACN) or Dichloromethane (DCM) and to this solution SIL (0.5 to 0.1 grams) was added and further mixed on the mixer at 2500 rpm for 5 minutes. The resultant solution was cast on Teflon dish and acetonitrile was evaporated in an inert atmosphere and dried in vacuum at 60° C. for 2 hours.

Example 4

Synthesis of Polymer Hybrid Solid Electrolyte with Ionically Conductive Ceramic Particles Added The ionically conducting polymer (0.5 to 0.9 grams) described in Example 1 and 0.1 to 0.14 g of lithium salt (LiTFSI) were dissolved in 3 ml of Acetonitrile (ACN) or Dichloromethane (DCM) and to this solution SIL (0.5 to 0.1 grams) was added and further mixed on the mixer at 2500 rpm for 5 minutes. The inorganic solid electrolyte Garnet-type Aluminum-doped Lithium Lanthanum Zirconate, LLZO—Li7La3Zr2O12 (0.02 to 0.3 g and a distributed particle size ranging from a few tens of nanometers to a few microns was added to the resultant solution (PEO based copolymer+SIL+ACN or DCM) and mixed at 2500 rpm for 5 minutes. The resultant solution was cast on Teflon dish and acetonitrile was evaporated in an inert atmosphere and dried in vacuum at 60° C. for 2 hours.

Figure 5:
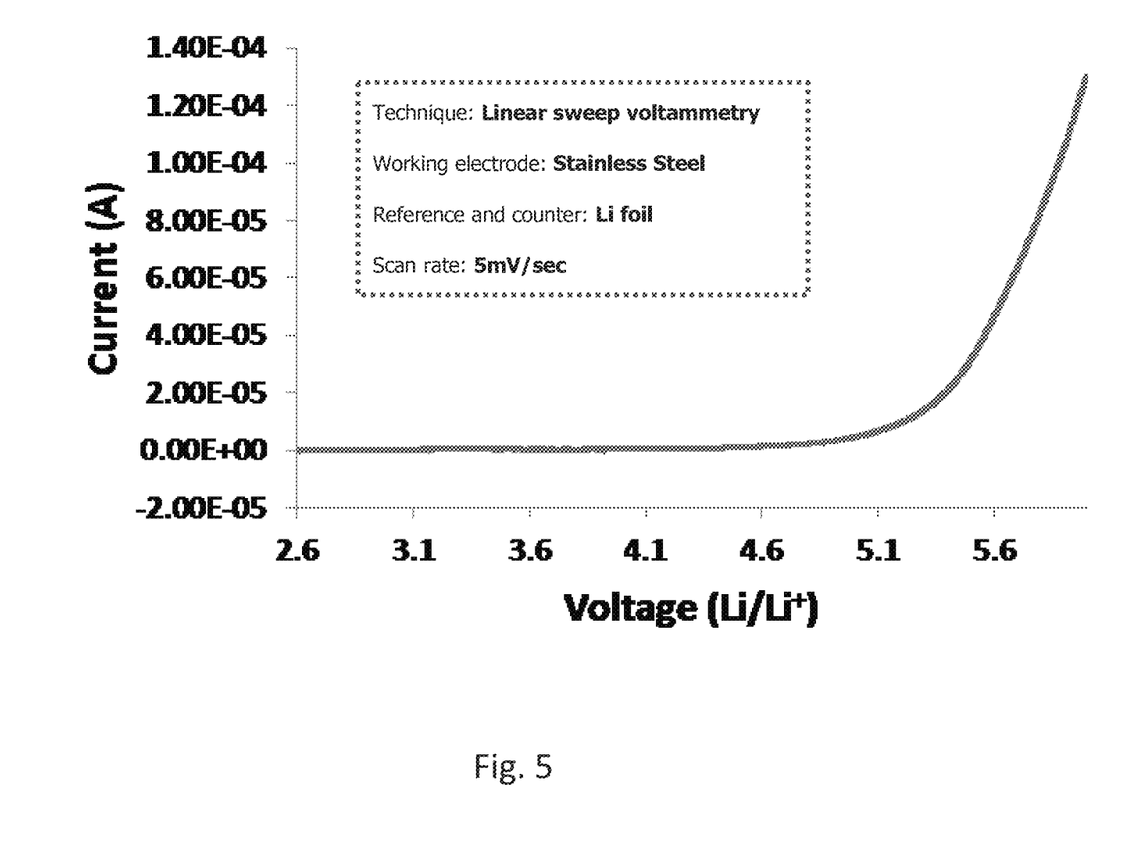
Figure 6:
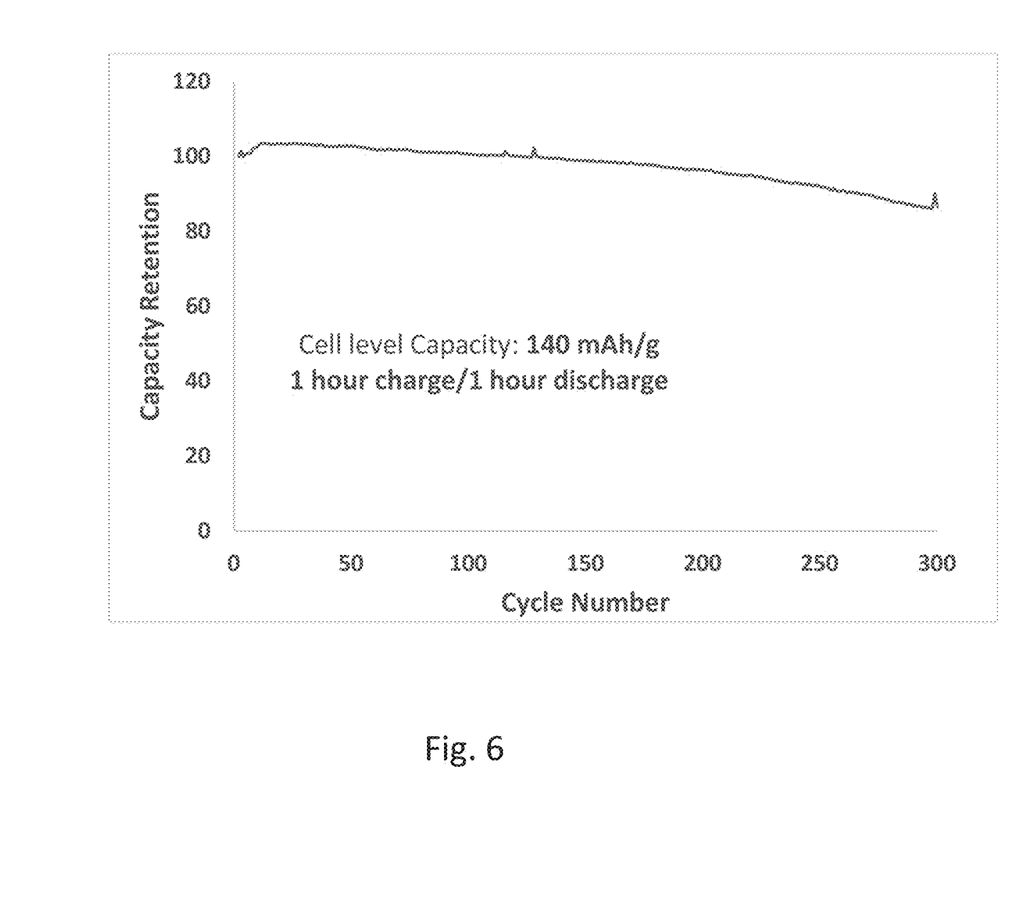
Figure 7:
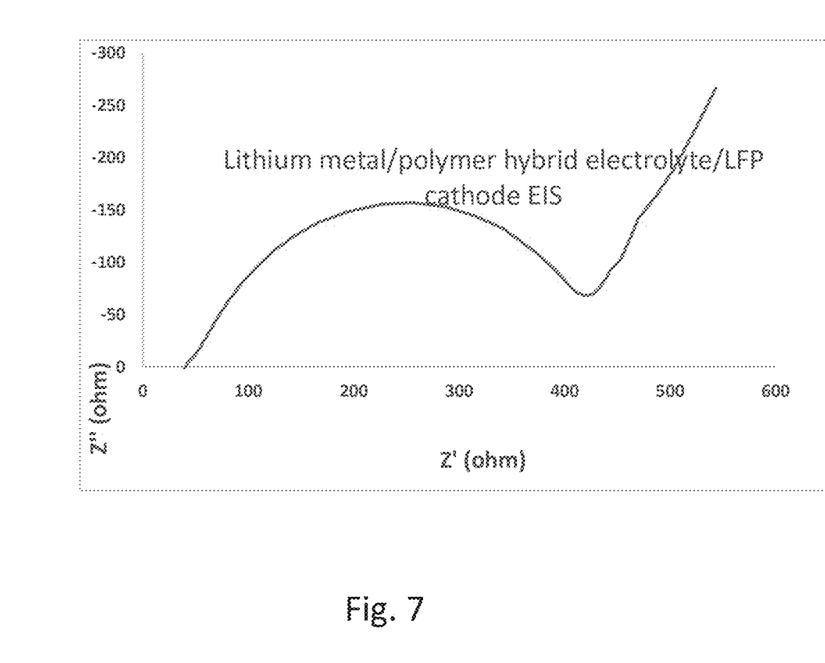
FIG. 7: EIS graph of polymer hybrid composite electrolyte with lithium metal and LFP cathode in the frequency range 1 MHz to 0.1 Hz at 25 deg C.
Figure 8:
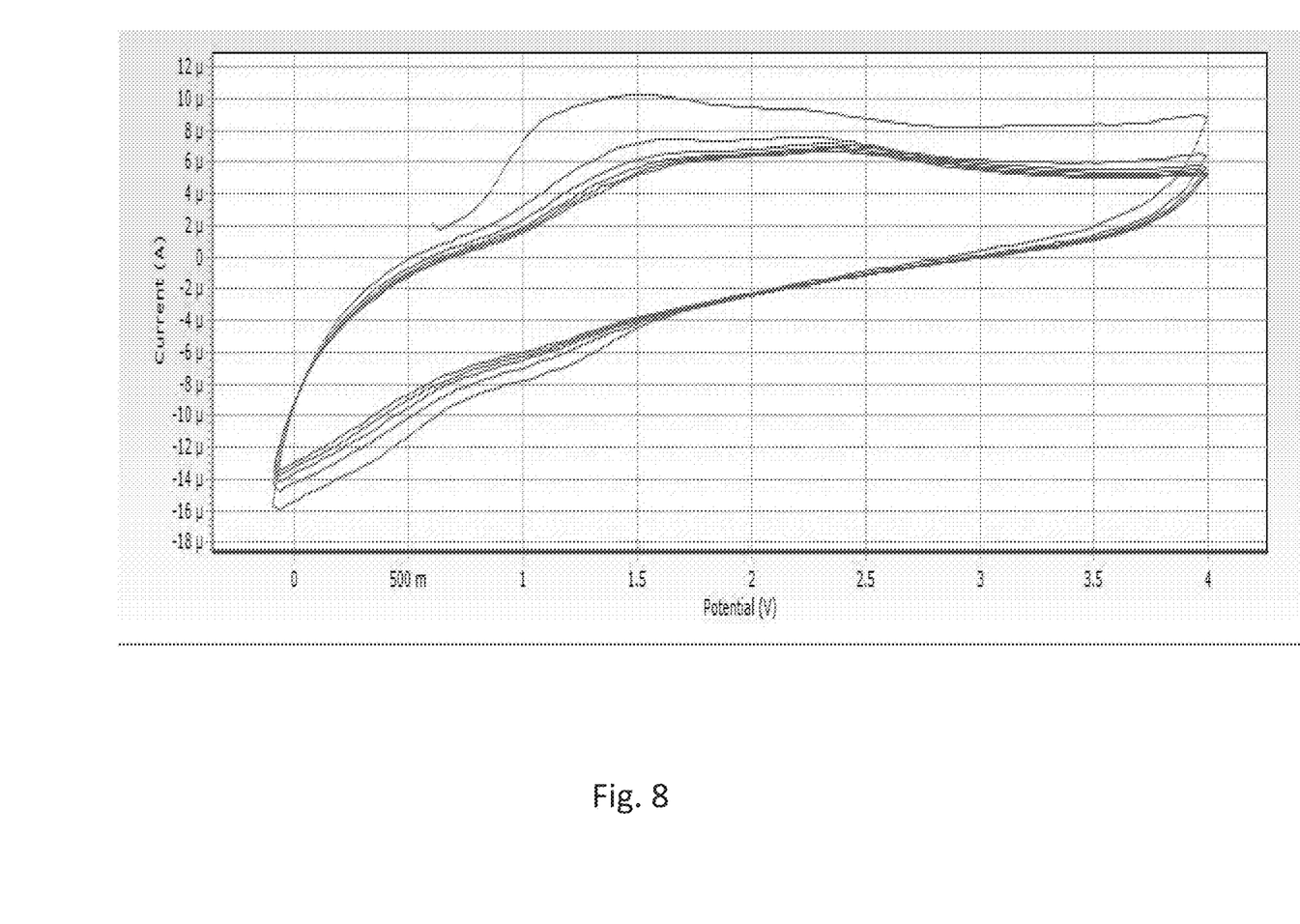
FIG. 8: Cyclic Voltammogram (CV) of ceramic polymer composite hybrid electrolyte with Lithium metal as reference and counter and Stainless steel as working electrode in the voltage range of –0.1 to 4V at 1 mv/Sec.

The polymer hybrid solid electrolyte anodic stability was measured with linear sweep voltammetry (LSV) with stainless steel as working electrode, lithium as counter and reference electrodes from open circuit voltage to 6V at 5 mv/Sec. FIG. 5 shows that the polymer hybrid solid electrolyte is stable until 5.2V. In contrast, the pure SIL and PEO based polymer electrolytes are not stable above 4.1V. The fact that the combination of PEO copolymer and SIL is stable until 5.2V confirms the interaction between tetraglyme and POSS inorganic crystallites. The stability of the polymer hybrid solid electrolyte with lithium metal was studied with cyclic voltammetry (CV) between −0.1-4V at 1 mv/sec as shown in FIG. 6. The superimposed CV curves on one another confirms the reversibility and stability of the polymer hybrid solid electrolyte with the lithium metal. One of the drawbacks of solid electrolyte materials in general is high interfacial resistance between electrolyte and electrodes. Electrochemical Impedance Spectroscopy (EIS) is used to measure interfacial resistance and other impedance contributions in the electrochemical cells. The EIS graph of the lithium metal coin cell made with the polymer hybrid solid electrolyte as a separator and LiFePO4 (LFP) as cathode is shown in FIG. 7. The low interfacial resistance (around 300 ohms) and total cell resistance (400 ohms) is due to the strong adhesion between the polymer hybrid solid electrolyte and electrodes. Another drawback of using solid electrolytes is the inability to cycle the battery at high C rate. However, the low resistance of the polymer hybrid solid electrolyte with electrodes allows the battery to be cycled at high C-rates. The cycling performance at 1-hour charge/discharge (1C) of the polymer hybrid solid electrolyte with lithium anode and $LiFePO_4$ cathode has 86% capacity retention after using for 600 hours as shown in FIG. 8.

Alternative materials and their ranges are listed below.
Solvate Ionic Liquids (SILs):

Lithium salt: Although LiTFSI (lithium bis(trifluoromethanesulfonyl)Imide) was used as an example of lithium salt, any lithium salt with good ionic conductivity can be used in the preparation of the solid electrolyte. This includes LiFSI (lithium bis(trifluoromethane)sulfonimide), LiBETE (lithium bis(pentafluoroethanesulfonyl)imide), and lithium triflate (lithium trifluoromethanesulfonate). Although tetraglyme was used an example for making SILs, triglyme can also be used with LiTFSI salt. The content of LiTFSI in the polymer hybrid solid electrolyte is between 5-20%, and more preferably 11-12%. When tetraglyme is combined with LiTFSI as SIL, the range of SIL is 10-50%, and more preferably, 30-35%.

Ceramic additive: Although Garnet-type Lithium Lanthanum Zirconate, LLZO—$Li_7La_3Zr_2O_{12}$ was used as an example of solid electrolyte, but (LSPS—$Li_{10}SnP_2S_{12}$, LGPS—$Li_{10}GeP_2S_{12}$, β-LPS—$Li_3PS_4$, LPSCl—$Li_6PS_5Cl$, LSPSCl—$Li_{9.54}Si_{1.74}P_{1.44}S_{11.7}Cl_{0.3}$, and LPS—$Li_{9.6}P_3S_{12}$), $Li_{1+x}Al_xTi_{2-x}(PO_4)_3$, LLTO—$Li_{0.5}La_{0.5}TiO_3$ can be used in the preparation of Ceramic containing Polymer-Hybrid Solid Electrolyte with range of 2 to 30%.

Although specific chemicals and specific concentrations are used in the aforementioned examples for illustrating the synthesis of the polymer hybrid solid electrolyte, similar chemicals in varying concentrations can be used to achieve a different polymer hybrid solid electrolyte with essentially the same hierarchical structure and performance.

We claim:
1. A polymer hybrid solid electrolyte composition comprising:
   a) a polyethylene oxide (PEO) based co-polymer electrolyte consisting of an amorphous PEO phase and a polyhedral oligomeric silsesquioxane (POSS) inorganic crystalline phase,
   b) a solvate ionic liquid (SIL) wherein the solvate ionic liquid forms connecting channels for Li+ conduction and the ether component of the SIL coordinates with the POSS inorganic crystalline phase to preserve the solvate structure of the SIL, and
   c) a salt of a monovalent cation.
2. The composition of claim 1, wherein the polymer hybrid solid electrolyte comprises connected electroactive solvation sites.
3. The composition of claim 1, wherein the co-polymer electrolyte comprises PEO segments chemically linked to POSS cages.
4. The composition of claim 1, wherein the SIL, contains an equimolar mixture of triglyme (G3) or tetraglyme (G4) and a salt of a monovalent cation.
5. The composition of claim 1, wherein the salt of a monovalent cation is a lithium salt.
6. The composition of claim 5, wherein the lithium salt is at least one of LiTFSI and LiClO4.
7. The composition of claim 1, wherein the salt of a monovalent cation is a sodium salt.
8. The composition of claim 7, wherein the sodium salt is at least one of NaTFSI and NaClO4.
9. The composition of claim 1, wherein the PEO based co-polymer ranges from 30 to 80 wt % of the total solid electrolyte composition.
10. The composition of claim 1, wherein the PEO based co-polymer ranges from 54 to 58 wt % of the total solid electrolyte composition.
11. The composition of claim 1, wherein the SIL ranges from 10-50 wt % of the total solid electrolyte composition.
12. The composition of claim 1, wherein the SIL ranges from 30-35 wt % of the total solid electrolyte composition.
13. The composition of claims 1, wherein the salt of the monovalent cation ranges from 5-40 wt % of the total solid electrolyte composition.
14. The composition of claim 1, further including an ionically conductive additive to impart mechanical strength to the electrolyte composition.
15. The composition of claim 14, wherein the ionically conductive additive comprises a ceramic.
16. The composition of claim 15, wherein the ceramic ionically conductive additive weight percentage is 2 to 30 wt % of the total composition.
17. The composition of claim 15, wherein the ceramic ionically conductive additive is at least one of: $Li_7La_3Zr_2O_{12}$ (LLZO); $Li_{10}SnP_2S_{12}$ (LSPS) $Li_{10}GeP_2S_{12}$ (LGPS); $Li_3PS_4$ (β-LPS); $Li_6PS_5Cl$(LSPSCl); $Li_{9.54}Si_{1.74}P_{1.44}S_{11.7}Cl_{0.3}Li_3PS_4$ (LSPSCl); $Li_{9.6}P_3S_{12}$ (LPS); $Li_{1+x}Al_xTi_{2-x}(PO_4)_3$(LATP) and $Li_{0.5}La_{0.5}TiO_3$ (LLTO).

* * * * *